G. MACLOSKIE.
AIR BRAKE SYSTEM.
APPLICATION FILED AUG. 24, 1907.
917,091.
Patented Apr. 6, 1909.
3 SHEETS—SHEET 1.
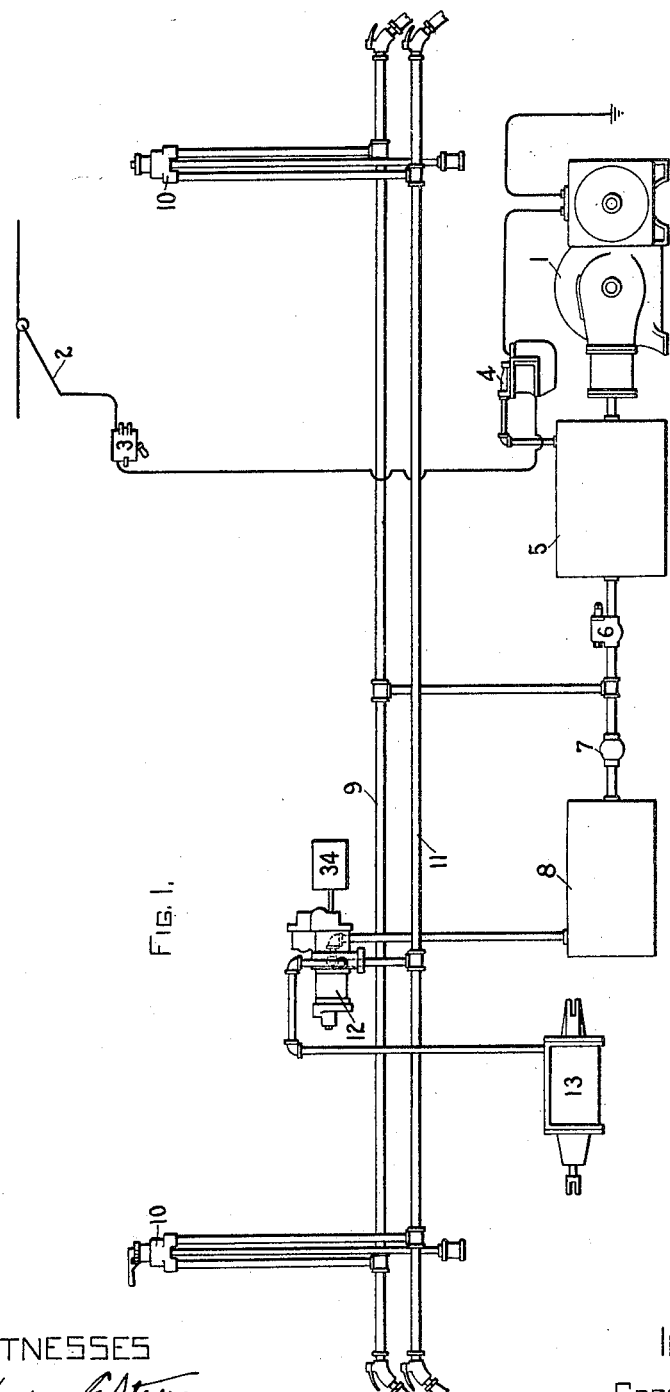
FIG. I.
WITNESSES
INVENTOR
GEORGE MACLOSKIE,
BY
ATT'Y.

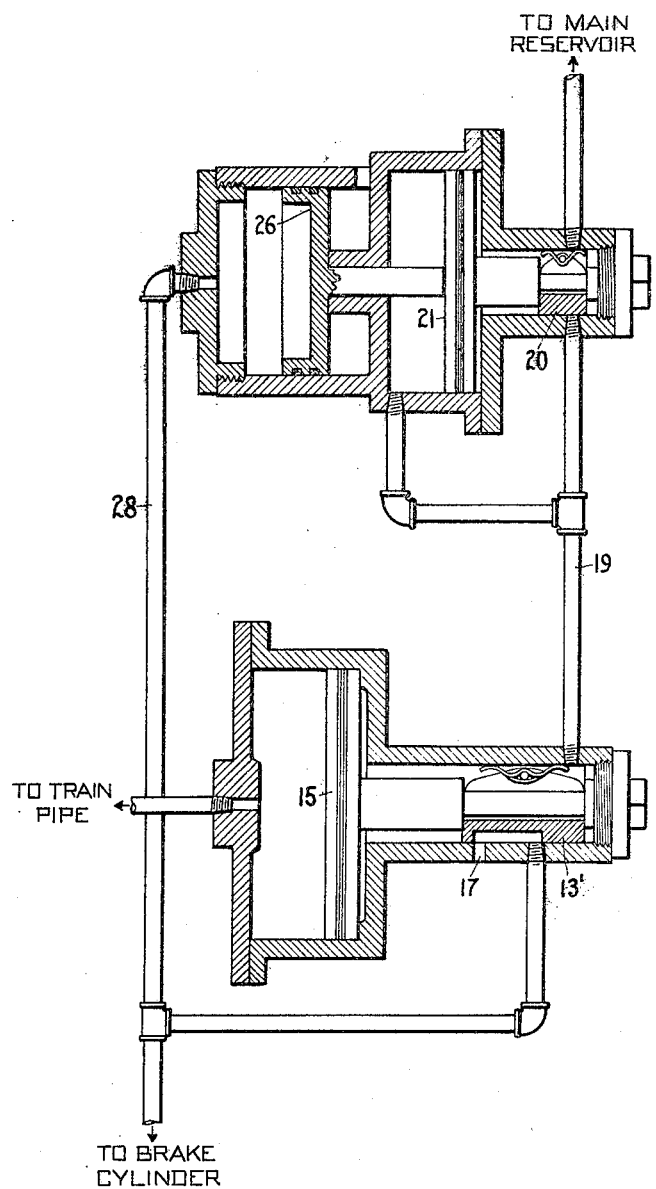

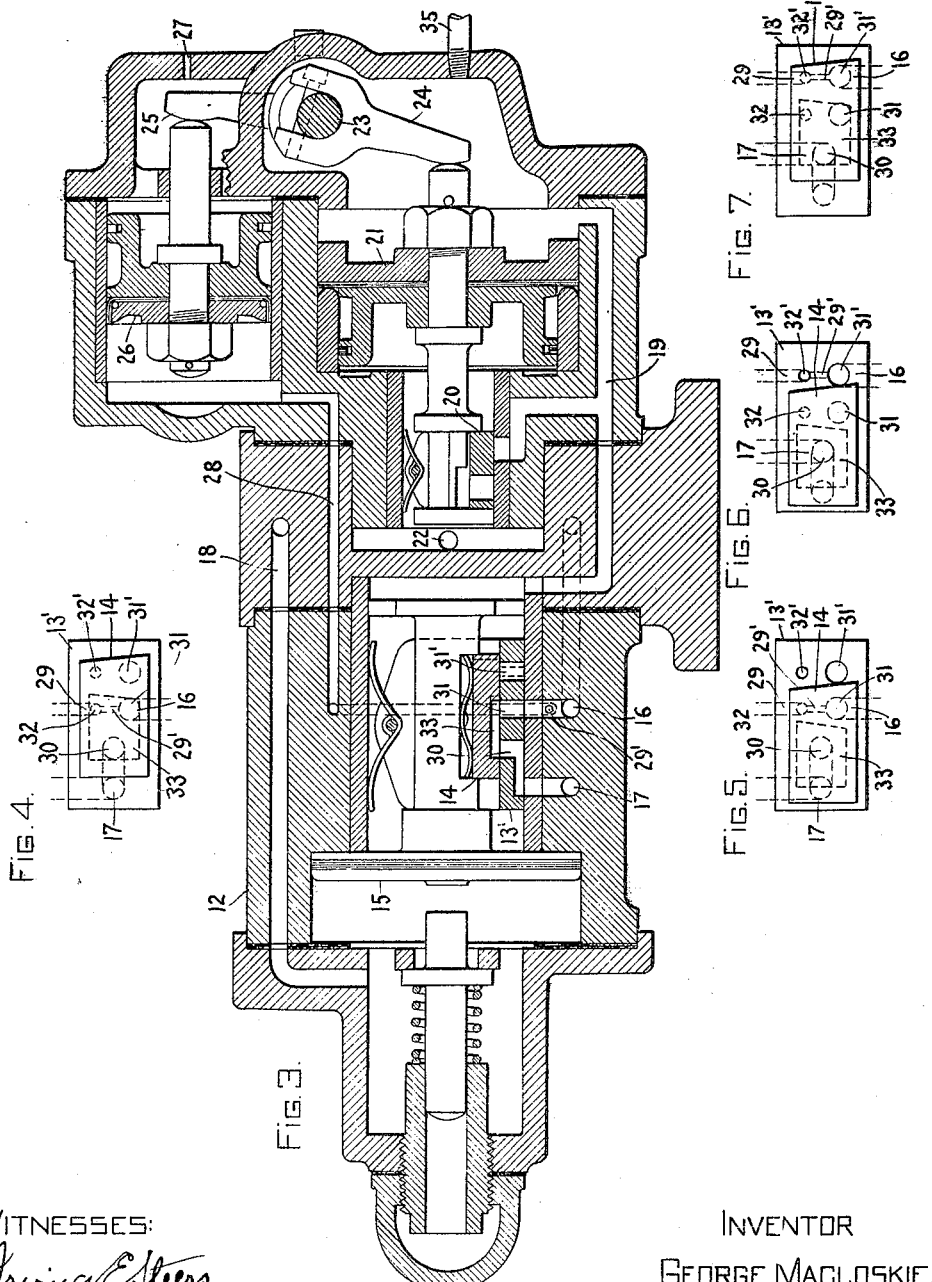

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

AIR-BRAKE SYSTEM.

No. 917,091.  Specification of Letters Patent.  Patented April 6, 1909.

Application filed August 24, 1907. Serial No. 390,063.

*To all whom it may concern:*

Be it known that I, GEORGE MACLOSKIE, a citizen of the United States, residing at Schenectady, county of Schenectady, State of New York, have invented certain new and useful Improvements in Air-Brake Systems, of which the following is a specification.

My invention relates to automatic air-brake systems and consists of a novel system of this character by means of which a graduated application and a graduated release of the brakes may be obtained; the system being also so designed that the pressure in all the brake cylinders will be equal notwithstanding differences in the travel of the different brake-cylinder pistons.

In carrying my invention into effect, I make use of a main valve having ports for controlling the supply of air to and the release of air from the brake cylinder, a piston for operating said valve, the piston chamber being in communication with the valve chamber on one side of the piston and with the train pipe on the other, a reservoir carrying air at substantially constant pressure, a controlling valve controlling the supply of air from said reservoir to the valve chamber of the main valve, and means for operating said controlling valve controlled in accordance with variations in the brake cylinder pressure. More specifically stated, I subject the operating means for the controlling valve to a substantially uniform pressure, such as reservoir pressure, opposed to the sum of brake cylinder pressure and the pressure in the chamber of the main valve. By means of this arrangement a predetermined lowering and raising of the train pipe pressure results in a proportionate increase or decrease of brake-cylinder pressure and when that proportionate increase or decrease has occurred the controlling valve is closed or opened as the case may be and the main valve is immediately returned to lap-position.

My invention will best be understood by reference to the following specification, and to the accompanying drawings, in which—

Figure 1 represents diagrammatically an automatic air-brake system arranged in accordance with my invention; Fig. 2 shows somewhat diagrammatically the automatic valves in simplest form shown in cross-section; Fig. 3 shows a cross-sectional view of the automatic valve mechanism in its preferred form; and Figs. 4 to 7, inclusive, show detail views of the main valve in its several positions.

In Fig. 1 I have shown my invention as applied to an electrically operated car or locomotive, and consequently have indicated a motor-driven compressor 1 which is supplied with current through the trolley 2 and cut-out switch 3, and controlled by a pressure governor 4. This compressor supplies the main reservoir 5, which is connected through the usual reducing valve 6 and check valve 7 to the service reservoir 8. It is, of course unnecessary to have a main source of air supply on each car of the train, but in any case all the service reservoirs must either be connected to a main reservoir or other source of substantially constant pressure, or, if charged from the train-pipe, must be large enough to maintain a substantially constant pressure through one or more brake applications. The constant pressure desired may be conveniently obtained by connecting all the main and service reservoirs to a reservoir line and this arrangement I have illustrated in Fig. 1, in which 9 represents the reservoir-line to which connection is made at a point between the reducing valve 6 and check valve 7. 10—10 represent the usual engineer's or motorman's valves, which are connected to reservoir-line 9, and also to the train-pipe 11. 12 represents a casing containing the main valve and the controlling valve, the details of which will be hereafter described. Pipe connections extend from this casing to the train-pipe 11, to reservoir 8, and to brake-cylinder 13.

The arrangement of the main valve and the controlling valve is shown in its simplest form in Fig. 2. In this figure, 13' represents a slide-valve which I term the main valve, actuated by the piston 15, which is exposed on its left-hand side to train-pipe pressure, and on its right-hand side is open to the main valve chamber. This chamber instead of being connected to a service reservoir as in the ordinary automatic system, is connected through pipe-connection 19 to a port controlled by the slide-valve 20 operated by the piston 21, and to the chamber on the left-hand side of piston 21. The slide-valve 20, which I term the controlling valve, controls the connection from main reservoir, which is connected to the chamber on the right-hand side of piston 21, through the pipe 19 to the chamber of the main valve 13'. Piston 21 is consequently subjected on its right-hand side to reservoir-pressure, and on its left-hand side to the pressure in the chamber of the main valve. The slide-valve 20 is operated by piston 21 and also by a smaller piston 26 mounted in a piston chamber which is open to atmosphere on its right-hand side, while its left-hand side is connected through pipe 28 to brake-cylinder, the stem of piston 26 abutting against piston 21. The two pistons 21 and 26, consequently, form for the controlling-valve 20 an operating mechanism subjected to reservoir pressure opposed to the sum of brake-cylinder pressure and the pressure in the chamber of the main valve 13'.

The operation of the valves is as follows: To apply the brakes, the pressure in the train-pipe is lowered a predetermined amount. Piston 15 is consequently moved to the left, shifting valve 13' and thereby disconnecting brake-cylinder from port 17 leading to atmosphere, and connecting it to the chamber of valve 13'. Since this chamber is connected through pipe 19 to the chamber on the left-hand side of piston 21 the pressure in the latter chamber is lowered; thereby causing valve 20 to be moved to the left and connecting reservoir to brake-cylinder. The pressure in the brake-cylinder rises until it reaches an amount which, acting on piston 26 and assisting the pressure on the left-hand side of piston 21, overpowers reservoir pressure and returns valve 20 to the position shown. A further slight flow of air from the chamber on the right-hand side of piston 15 to brake-cylinder reduces the pressure in that chamber and causes piston 15 to return toward the position shown, far enough to move the valve 13' to lap-position. A further reduction of train-pipe pressure results in a repetition of the operations above described.

If it is desired to release the brakes in part, the pressure in the train-pipe is partially restored. This causes piston 15 to move to the position shown in Fig. 2, connecting brake cylinder to atmosphere through port 17, and lowering the brake-cylinder pressure. When the brake-cylinder pressure falls a certain amount, correspondingly reducing the pressure on piston 26, reservoir pressure on the right of piston 21 over-balances the two pressures that oppose it, and causes valve 20 to move toward the left, momentarily connecting reservoir to the main valve chamber on the right-hand side of piston 15 and to the chamber on the left-hand side of piston 21. The pressure in both these chambers rises quickly, returning piston 15 toward the left and lapping valve 13', and returning piston 21 toward the right and closing valve 20. A further increase in train-pipe pressure results in a repetition of this operation. It will be seen that both in application and in the release of the brakes the brake-cylinder pressure determines the movement of the valves to lap-position, so that the same pressure is obtained in all the brake cylinders on the train, regardless of differences in the travels of the brake-cylinder pistons.

The preferred construction of the main valve and of the controlling valve which embody my invention is shown in cross-section in Fig. 3. In this figure, 13' represents the main valve proper and 14 the graduating valve; both of which are operated by the piston 15. A port 16 in the valve-seat leads to the brake cylinder; another port 17 leads to atmosphere; while the passage 18 leads from the piston chamber at the left of piston 15 to train-pipe. The valve chamber at the right-hand side of the main valve piston 15, is connected through a passage 19 to a port in the seat of the controlling valve 20 operated by a piston 21. The passage 19 is also in communication with the piston chamber at the right-hand side of this piston. The left-hand side of piston 21 and the chamber in which the valve 20 moves are connected through a passage 22 to the service reservoir or other source of air under substantially constant pressure. 23 represents a pin or shaft journaled in the wall of the casing containing the piston 21, having one arm 24 within the casing engaging the spindle of valve 20, while another arm 25, outside the casing engages the spindle of a piston 26, which is in a second chamber or casing separate from that in which the piston 21 moves. The shaft 23, with the arms 24 and 25, forms a bell-crank lever connecting the pistons 21 and 26. The advantage of this particular form of connection is that by its use leakage from one piston to the other or from piston 21 to atmosphere is prevented, since the opening in the casing through which the pin 23 passes may readily be made air tight. The right-hand side of piston 26 is open to atmosphere through a small hole 27 in the casing, while the left-hand side of the piston is connected by a passage 28 to a small auxiliary port 29 in the seat of the main valve. This auxiliary port 29' is connected by a restricted passage 29', shown in Figs. 4 to 7, with the main port 16 leading to brake-cylinder.

The main valve 13' is provided with an L-shaped port 30 and two pairs of ports 31 and 32, and 31' and 32', of which each pair is arranged to register with the ports 16 and 29 in the valve-seat in one position of the main valve 13'. The graduating valve 14 is provided with a chamber or passage 33 in its lower side, the shape of which is shown in dotted lines in Figs. 4 to 7.

The operation of the valve mechanism above described, is as follows: Fig. 3 shows all the parts in running or release position, the positions of the main and graduating valve with respect to the ports in the valve-seat, being shown in Fig. 4. To apply the brakes a certain reduction of pressure is made in the train-pipe. This lowers the pressure on the left-hand side of the piston 15 of the main valve, causing the piston to move to the left, shifting the graduating valve and then the main valve toward the position shown in Fig. 6, which shows the extreme position of the valves for emergency application. In this position the ports 31' and 32' in the main valve 13' register with the ports 16 and 29 in the valve-seat. For ordinary service applications the registry of these valves is only partial. The piston chamber at the right-hand side of the piston 15 is put in communication with the brake-cylinder through port 16 and with the piston chamber at the left-hand side of piston 26 through port 29 and passage 28. This results in lowering the pressure on the right-hand side of the piston 15, and this reduction of pressure is communicated through passage 19 to the right-hand side of piston 21, so that before the pressure on the right-hand side of piston 15 has been materially reduced the piston 21 moves to the right, shifting valve 20 and placing reservoir in communication with piston 15 and with brake cylinder through passage 22, valve 20, passage 19, port 31' and port 16. At the same time reservoir is connected to the left-hand side of piston 26, so that the pressure in brake-cylinder and in the space to the left of piston 26 rise together. Equalization between these pressures is maintained by the restricted passage between ports 29 and 16 in the main valve-seat. When the pressure in the brake-cylinder and consequently on the left-hand side of the piston 26 has reached a certain amount, the pressure on piston 26 assisting the pressure on the right-hand of piston 21, again balances reservoir pressure on the left-hand side of piston 21, so that valve 20 is returned to the position shown in Fig. 3 cutting off the reservoir from the chamber of the main valve, so that a further small flow of air to brake-cylinder equalizes the pressure on the opposite side of piston 15 and the piston and graduating valve 14 are returned to lap-position, as shown in Fig. 7. A further reduction of train-pipe pressure results in a repetition of the operations just described, and an increase of brake-cylinder pressure. To release the brakes partially, the pressure in the train-pipe is increased a small amount. This causes the piston 15 to move to the right, returning the main and graduating valves to the position shown in Fig. 3 and Fig. 4. In this position ports 29 and 16, in communication with the left-hand side of piston 26 and with brake-cylinder, respectively, are connected to atmosphere through ports 31 and 32, chamber 33, port 30 and port 17. The pressure both in the brake cylinder and on the left-hand side of piston 26 consequently falls, until the sum of the pressures, due to brake-cylinder pressure on the piston 26 and the pressure on the right-hand side of piston 21, falls below the reservoir-pressure on the left-hand side of piston 21. When this occurs, piston 21 moves to the right, opening valve 20, connecting reservoir 22 momentarily to the valve chamber on the right-hand side of piston 15, so as to cause this piston to move the graduating valve to lap-position, as shown in Fig. 5. At the same time the pressure rises on the right-hand side of piston 21, so as to return valve 20 and cut off the reservoir from the main valve chamber. Further increase of train-pipe pressure results in a repetition of the above described operations, and in a further reduction of brake-cylinder pressure. In this manner, a graduated release of the brakes is obtained as effectively as in a straight-air system, and furthermore, the pressures in all the brake-cylinders are equal, regardless of differences in piston travel of the brake cylinders, since the operation of the valves is controlled by the pressure in the brake cylinder itself. By making the piston 26 smaller than piston 21, a given variation of train-pipe pressure results in a comparatively greater variation of pressure in brake-cylinder. For instance, if the effective area of piston 21 is twice that of piston 26, a reduction of five pounds in the train-pipe will give an increase of ten pounds in the brake-cylinder.

The purpose of providing an auxiliary port in the main valve connected to the left-hand side of piston 26, is to make the rise and fall of pressure on this piston, and consequently the operation of the piston, more definite than would be possible if the connection to this piston were made only from the passage leading to the brake cylinder, since in the latter case the flow of air through that passage would produce false pressure-variations on the piston. These disturbing effects are avoided by the use of the auxiliary port 29 in the valve-seat of the main valve. It will be noticed that the graduating valve 14 is so arranged that in moving from application position shown in Fig. 6 to lap-position shown in Fig. 7, and back again to application position, ports 16 and 29 are opened and closed simultaneously. Similarly, in moving from release position shown in Fig. 4 to lap-position shown in Fig. 5, and back again to release-position, ports 16 and 29 are opened and closed simultaneously. The restricted connection between ports 29 and 16 serves to maintain an equalization of brake-cylinder pressure and the pressure on piston 26, both during increase and reduction of pressure, and also during prolonged brake-applications when leakage either from brake cylinder or from the space at the left of piston 26 might occur.

Leakage around the piston 15, by which the main valve is operated, affects, of course, the sensitiveness of operation of the system and since it is practically impossible in a working system to avoid some leakage around this piston, I prefer to give the valve chamber of the main valve sufficient capacity so that it will act as a pressure equalizer and prevent such a leakage of air as is likely to occur in practice from affecting the movement of the main valve in response to changes in train-pipe pressure. Instead of enlarging the valve chamber itself, I prefer in practice to connect to it a small reservoir having the requisite capacity for the purpose above described. Such a reservoir is shown at 34 in Fig. 1 and the pipe connection from the main valve chamber to this reservoir is shown at 35 in Fig. 3. In practice the capacity of the main valve chamber should be made large enough so that the valve will quickly respond to a desired variation of train-pipe pressure and the larger the capacity of the chamber the smaller will be the variation in train-pipe pressure requisite to produce a movement of the valve. For practical operation I have found that a very small capacity is sufficient for this purpose.

What I claim as new and desire to secure by Letters Patent of the United States, is,—

1. An automatic air-brake system, comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, and means responsive to the pressure in the brake cylinder for controlling the operation of said controlling valve.

2. An air-brake system comprising a reservoir containing air under substantially constant pressure, a brake cylinder, a train-pipe, a main valve and a controlling valve controlling the supply of air to and the exhaust of air from said brake cylinder, the main valve having ports connected to brake cylinder and atmosphere and being provided with an operating piston connected on the one side to the train-pipe and on the other side to the chamber of said valve, and the controlling valve controlling the connection between the reservoir and the valve chamber of the main valve, the controlling valve being provided with a piston connected on one side to its own valve chamber and on the other side to the valve chamber of the main valve, and a second piston for closing the controlling valve connected on one side to the brake cylinder and on the other side to atmosphere.

3. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, and operating means therefor subjected to a substantially uniform pressure opposed to the sum of brake-cylinder pressure and a pressure proportional to the pressure in the valve chamber of the main valve.

4. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, and operating means therefor subjected to a substantially uniform pressure opposed to the sum of brake-cylinder pressure and the pressure in the valve chamber of the main valve, the effective area subjected to brake-cylinder pressure being less than that subjected to the pressure in the chamber of the main valve.

5. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, and operating means therefor subjected to reservoir pressure opposed to the sum of brake cylinder pressure and a pressure proportional to the pressure in the chamber of the main valve, the effective area subjected to brake-cylinder pressure being less than that subjected to the pressure in the chamber of the main valve.

6. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, and means controlled by the brake-cylinder pressure for controlling said controlling valve, the main valve being provided with an auxiliary port connected to the controlling means for the controlling valve.

7. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, means controlled by the brake-cylinder pressure for controlling said controlling valve, the main valve being provided with an auxiliary port connected to said controlling means, and a restricted connection between said auxiliary port and the main port leading to brake cylinder.

8. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, means controlled by the brake-cylinder pressure for controlling said controlling valve, the main valve being provided with an auxiliary port connected to said controlling means and being arranged to open and close said auxiliary port simultaneously with the opening and closing of the main port leading to brake cylinder.

9. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, means controlled by the brake-cylinder pressure for controlling said controlling valve, the main valve being provided with an auxiliary port connected to said controlling means, and being arranged to open and close said auxiliary port simultaneously with the opening and closing of the main port leading to brake cylinder, and a restricted connection between said auxiliary port and said main port.

10. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, and operating means therefor subjected to a substantially uniform pressure opposed to the sum of brake-cylinder pressure and the pressure in the chamber of the main valve, the main valve being provided with an auxiliary port opening into the passage by which brake-cylinder pressure is conveyed to said operating means and being arranged to open and close said auxiliary port simultaneously with the opening and closing of the main port leading to brake cylinder.

11. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, operating means therefor subjected to a substantially uniform pressure opposed to the sum of brake-cylinder pressure and a pressure proportional to the pressure in the chamber of the main valve, the main valve being provided with an auxiliary port opening into the passage by which brake-cylinder pressure is conveyed to said operating means and being arranged to open and close said auxiliary port simultaneously with the opening and closing of the main port leading to brake cylinder, and a restricted connection between said auxiliary port and said main port.

12. An automatic air-brake system comprising a brake cylinder, a train-pipe, a main valve provided with ports for controlling the supply of air to and the release of air from the brake cylinder, a piston for operating said valve, the piston chamber being in communication with the valve chamber on one side of the piston and with the train-pipe on the other, a reservoir containing air under substantially constant pressure, a controlling valve for controlling the supply of air from said reservoir to the valve chamber of the main valve, an operating piston therefor subjected on one side to reservoir pressure and on the other side to a pressure proportional to the pressure in the chamber of the main valve, a bell-crank lever journaled in the casing having one arm inside the casing operatively connected to said piston and a second arm outside the casing, a second casing inclosing the second arm, and a piston within the second casing operatively connected to the second arm and subjected to brake-cylinder pressure.

13. In an automatic air-brake system, a casing, a valve therein, an operating piston for said valve subjected to opposing pressures, a bell-crank lever journaled in the casing having one arm inside the casing operatively connected to said piston and a second arm outside the casing, a second casing inclosing the second arm, and a piston within the second casing operatively connected to the second arm.

14. An automatic air-brake system, comprising a reservoir containing air under substantially constant pressure, a brake cylinder, a train-pipe, a main valve provided with ports for controlling the supply of air to and the release of air from the brake cylinder, a piston for operating the said valve, the piston chamber being in communication with the valve chamber on one side of the piston and with the train-pipe on the other, a controlling valve for controlling the supply of air from said reservoir to the valve chamber of the main valve, an operating piston therefor, having its piston chamber subjected on one side to reservoir pressure and on the other side to the pressure in the chamber of the main valve, and a second piston operatively connected to the controlling valve, the piston chamber of said second piston being connected on one side to atmosphere and on the other side to the brake cylinder.

15. An automatic air-brake system comprising a reservoir containing air under substantially constant pressure, a brake cylinder, a train-pipe, a main valve provided with ports for controlling the supply of air to and the release of air from the brake cylinder, a piston for operating the said valve, the piston chamber being in communication with the valve chamber on one side of the piston and with the train-pipe on the other, a controlling valve for controlling the supply of air from said reservoir to the valve chamber of the main valve, an operating piston therefor, having its piston chamber subjected on one side to reservoir pressure and on the other side to the pressure in the chamber of the main valve, and a second piston operatively connected to the controlling valve, the piston chamber of said second piston being connected to the brake cylinder through a restricted passage.

16. An automatic air-brake system comprising a reservoir containing air under substantially constant pressure, a brake cylinder, a train-pipe, a main valve provided with ports for controlling the supply of air to and the release of air from the brake cylinder, a piston for operating the said valve, the piston chamber being in communication with the valve chamber on one side of the piston and with the train-pipe on the other, a controlling valve for controlling the supply of air from said reservoir to the valve chamber of the main valve, an operating piston therefor, having its piston chamber subjected on one side to reservoir pressure and on the other side to a pressure proportional to the pressure in the chamber of the main valve, and a second piston operatively connected to the controlling valve, the piston chamber of said second piston being connected through a restricted passage to the brake cylinder when the main valve is in its release position and to the main valve chamber when the main valve is in its application position.

17. An automatic air-brake system comprising a reservoir containing air under substantially constant pressure, a brake cylinder, a train-pipe, a main valve provided with ports for controlling the supply of air to and the release of air from the brake cylinder, a piston for operating the said valve, the piston chamber being in communication with the valve chamber on one side of the piston and with the train-pipe on the other, a controlling valve for controlling the supply of air from said reservoir to the valve chamber of the main valve, an operating piston therefor, having its piston chamber subjected on one side to reservoir pressure and on the other side to the pressure in the chamber of the main valve, and a second piston operatively connected to said controlling valve and having its piston chamber connected to brake cylinder, said second piston being of smaller area than the operating piston of said valve.

18. An automatic air brake system comprising a reservoir containing air under substantially constant pressure, a brake cylinder, a train-pipe, a main valve provided with ports for controlling the supply of air to and the release of air from the brake cylinder, a piston for operating the said valve, the piston chamber being in communication with the valve chamber on one side of the piston and with the train-pipe on the other, a controlling valve for controlling the supply of air from said reservoir to the valve chamber of the main valve, an operating piston therefor, having its piston chamber subjected on one side to reservoir pressure and on the other side to a pressure proportional to the pressure in the chamber of the main valve, a second piston operatively connected to the controlling valve, a restricted passage connecting the piston chamber of said second piston to the brake cylinder connection, and a port in the valve seat of the main valve communicating with said passage.

In witness whereof, I have hereunto set my hand this 23rd day of August, 1907.

GEORGE MACLOSKIE.

Witnesses:
 HELEN ORFORD,
 ARBA B. MARVIN, Jr.